United States Patent
Graf (10) Patent No.: US 9,325,630 B2
(45) Date of Patent: Apr. 26, 2016

(54) WILD CARD FLOWS FOR SWITCHES AND VIRTUAL SWITCHES BASED ON HINTS FROM HYPERVISORS

(71) Applicant: Red Hat, Inc., Raleigh, NC (US)

(72) Inventor: Thomas Graf, Fehraltorf (CH)

(73) Assignee: Red Hat, Inc., Raleigh, NC (US)

( * ) Notice: Subject to any disclaimer, the term of this patent is extended or adjusted under 35 U.S.C. 154(b) by 214 days.

(21) Appl. No.: 14/017,113

(22) Filed: Sep. 3, 2013

(65) Prior Publication Data

US 2015/0009831 A1 Jan. 8, 2015

Related U.S. Application Data

(60) Provisional application No. 61/843,258, filed on Jul. 5, 2013.

(51) Int. Cl.
| | |
|---|---|
| *H04J 1/16* | (2006.01) |
| *H04L 12/833* | (2013.01) |
| *H04L 12/713* | (2013.01) |
| *H04L 12/64* | (2006.01) |
| *H04L 12/931* | (2013.01) |
| *H04L 12/741* | (2013.01) |

(52) U.S. Cl.
CPC ............ *H04L 47/31* (2013.01); *H04L 12/6418* (2013.01); *H04L 45/586* (2013.01); *H04L 49/70* (2013.01); *H04L 45/745* (2013.01)

(58) Field of Classification Search
None
See application file for complete search history.

(56) References Cited

U.S. PATENT DOCUMENTS

| | | | |
|---|---|---|---|
| 8,688,681 B1* | 4/2014 | Xiao | ......................... G06F 7/00 707/709 |
| 2011/0320632 A1 | 12/2011 | Karino | |
| 2012/0300615 A1 | 11/2012 | Kempf et al. | |
| 2012/0324442 A1 | 12/2012 | Barde | |
| 2013/0010600 A1 | 1/2013 | Jocha et al. | |
| 2013/0010605 A1 | 1/2013 | Jocha et al. | |
| 2013/0054761 A1 | 2/2013 | Kempf et al. | |
| 2014/0192646 A1* | 7/2014 | Mir et al. | ...................... 370/235 |
| 2014/0226661 A1* | 8/2014 | Mekkattuparamban et al. | ............................ 370/392 |

FOREIGN PATENT DOCUMENTS

WO WO 2012130264 A1 10/2012

OTHER PUBLICATIONS

Curtis et al., "DevoFlow: Scaling Flow Management for High-Performance Networks," SIGCOMM'11, Aug. 15-19, 2011, Toronto, Ontario, Canada, 12 pages.
Bianco et al., "OpenFlow Switching: Data Plane Performance," Communications (ICC), 2010 IEEE International Conference, May 23-27, 2010, 5 pages.
Fernandes et al., "Virtual Networks: Isolation, Performance, and Trends," Annals Of Telecommunications—Annales Des Télécommunications, Jun. 1, 2011, vol. 66, Issue 5-6, pp. 339-355.
FAQ, "Open vSwitch," Published May 2, 2013, 17 pages.
Datasheet, "VMware NSX, The Platform for Network Virtualization," WMware, Palo Alto, CA, Aug. 2013, 2 pages.

* cited by examiner

*Primary Examiner* — Willie J Daniel, Jr.
(74) *Attorney, Agent, or Firm* — Lowenstein Sandler LLP (57) ABSTRACT

A network switch receives routing information pertaining to a virtual machine from a hypervisor managing the virtual machine. The switch adds a wild card entry associated with the virtual machine to a first routing data structure, wherein the wild card entry specifies one or more exact match fields, one or more wild card fields and an action to perform for packets having properties that match the one or more exact match fields.

19 Claims, 6 Drawing Sheets

WILD CARD FLOWS FOR SWITCHES AND VIRTUAL SWITCHES BASED ON HINTS FROM HYPERVISORS

RELATED APPLICATIONS

This patent application claims the benefit under 35 U.S.C. §119(e) of U.S. Provisional Application No. 61/843,258, filed Jul. 5, 2013, which is herein incorporated by reference.

TECHNICAL FIELD

Embodiments of the present invention relate to network switches, and more specifically to managing the routing of data to and from devices by switches and virtual switches using wild card flows.

BACKGROUND

Traditional network appliances are hardware computing devices that are configured to perform a specific task or tasks on data packets that they receive. These network devices may be configured to intercept messages sent between two computing devices, and to operate on those messages before sending them on. Examples of such network appliances include a firewall, a wide area network (WAN) optimizer, switches, and so forth.

Network switches are networking devices that link together computing devices. A switch receives packets from devices connected to a network, and transmits or drops the packets based on routing or switching rules. Virtual switches are versions of switches that are implemented completely or partially in software. The greater the number of different network traffic flows on a network, the slower the switch or switches on that network may perform. For physical switches, slow switching caused by a large number of unique flows can be addressed by adding additional physical resources. However, such a solution is not typically available for virtual switches. Accordingly, many virtual switches experience a modest or significant slow down in switching speeds as the number of unique network traffic flows increases.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for routing data packets (e.g., messages) using wild card routing tables and/or wild card flow entries to improve the performance of network switches. Some embodiments are directed to virtual switches that use wild card routing tables and/or wild card flow entries.

Virtual switches typically include a very fast first component that operates in a kernel space of an operating system and a slower second component that operates in a user space of the operating system. Such virtual switches use exact match routing tables having exact match flow entries that identify actions to perform on packets having properties that match every field of the exact match flow entries. Packets are checked against the exact match routing tables by the first component in the kernel space.

Whenever a new packet is received that does not match an exact match flow entry, the second component in the user space determines what action should be performed and adds a new entry to the exact match routing table. The new entry has fields that match the parameters of the new packet. The process of transferring over to the second component in the user space and back can take multiple milliseconds, slowing down the virtual switch. Additionally, the performance of the routing table is a function of the size of the routing table. As the size of the exact match routing table increases, the amount of time that it takes to search through the routing table also increases, impairing the performance of the switch.

Embodiments of the present invention provide a switch and virtual switch that use wild card flow entries for routing of packets in a network. A single wild card flow entry may provide routing for many different network traffic flows, each of which would traditionally have its own exact match flow entry. This may significantly reduce the size of the routing tables. For example, depending on the nature of the network traffic, the number of entries in the routing tables may be reduced by a factor of 10 to a factor of 1000.

In one embodiment, a switch receives routing information pertaining to a virtual machine from a hypervisor managing the virtual machine. The switch may be a physical switch or may be a virtual switch. The switch adds a wild card flow entry associated with the virtual machine to a first routing table. The wild card entry specifies one or more exact match fields, one or more wild card fields and an action to perform for packets having properties that match the one or more exact match fields. When a new packet is received, the switch checks the new packet against the wild card entries in the flow table. If a match to a wild card flow entry is identified, the switch performs an action specified in the wild card flow entry.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some embodiments are described herein with reference to virtual switches. However, it should be appreciated that the principles introduced and described with reference to virtual switches also apply to physical network switches. Accordingly, embodiments of the present invention are not limited to virtual switches, and those embodiments describing virtual switches may be modified for use in physical network switches.

Figure 1:
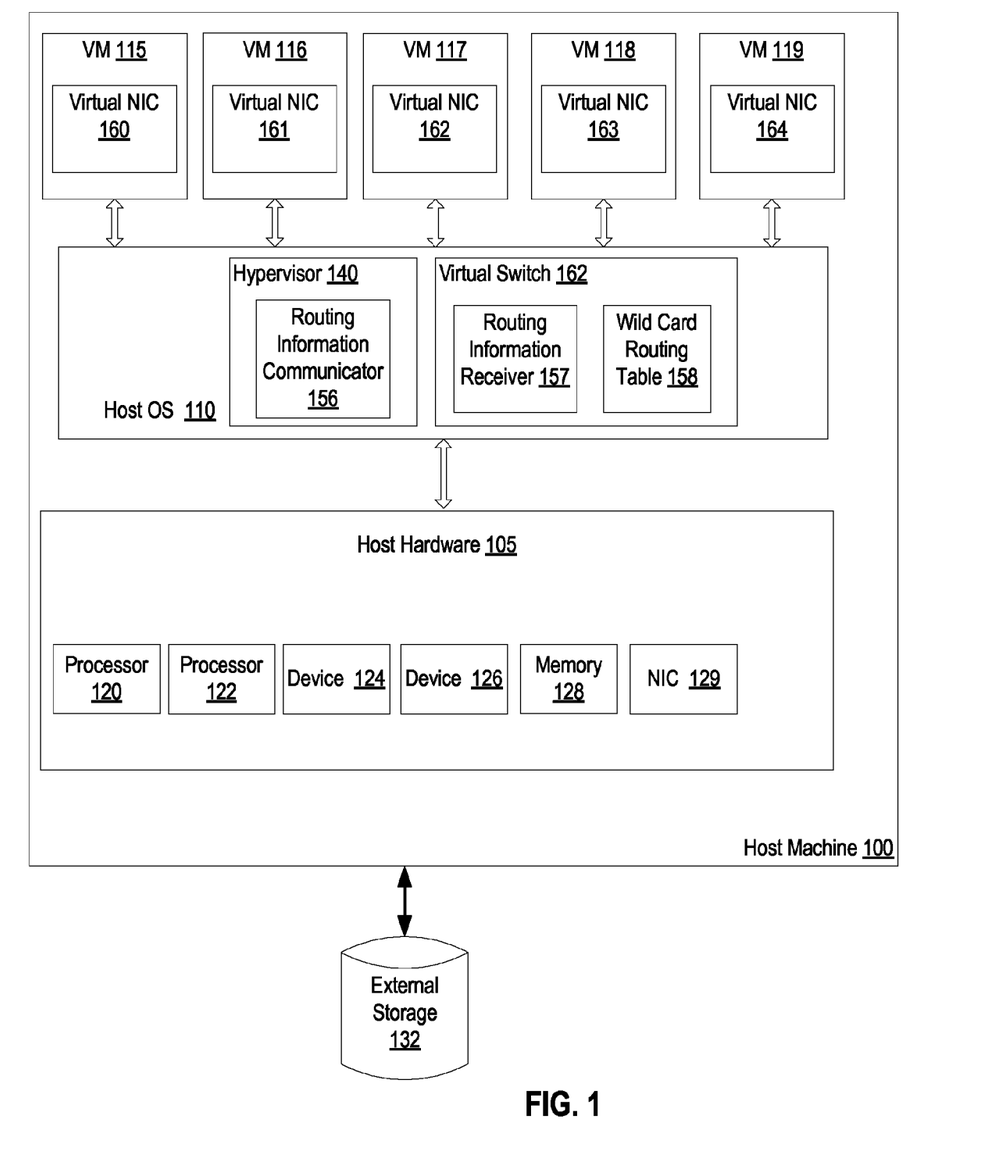
FIG. 1 is a block diagram that illustrates an embodiment of a computer system that hosts one or more virtual machines and a virtual switch.

FIG. 1 is a block diagram that illustrates an embodiment of a computer system (referred to herein as a host machine 100) that hosts one or more virtual machines (VMs) 115-119. The host machine 100 may be a rackmount server, a workstation, a desktop computer, a notebook computer, a tablet computer, a mobile phone, a palm-sized computing device, a personal digital assistant (PDA), etc. The host machine 100 includes host hardware 105, which may include multiple processors 120, 122, multiple devices 124, 126, memory 128, physical network interface controllers (NICs) 129, and other hardware components. The memory 128 may include volatile memory devices (e.g., random access memory (RAM)), non-volatile memory devices (e.g., flash memory), and/or other types of memory devices. The host hardware 105 may also be coupled to external storage 132 via a direct connection or a local network. The host machine 100 may be a single machine or multiple host machines arranged in a cluster.

Each of the devices 124, 126 may be a physical device that is internal or external to the host machine 100. Examples of internal devices include a graphics card, hardware RAID controller, secondary storage (e.g., hard disk drive, magnetic or optical storage based disks, tapes or hard drives), universal serial bus (USB) devices, internal input/output (I/O) devices, etc. Examples of external devices include a keyboard, mouse, speaker, external hard drive (e.g., external storage 132), external I/O devices, etc.

The NICs 129 may be Ethernet controllers, Wi-Fi controllers, Token Rings, and so forth. The NICs 129 provide functionality to communicate over a network using specific physical layer (OSI layer 1) and data link layer (OSI layer 2) standards (e.g., Ethernet, Wi-Fi, Token Ring, etc.). Each NIC 129 includes a unique media access control (MAC) address, which may be stored in a read only memory of the NIC 129.

The host machine 100 includes a hypervisor 140 (also known as a virtual machine monitor (VMM)). In one embodiment (as shown) hypervisor 140 is a component of a host operating system (OS) 110. Alternatively, the hypervisor 140 may run on top of a host OS 110, or may run directly on host hardware 105 without the use of a host OS 110.

The hypervisor 140 may manage system resources, including access to memory 128, devices 124, 126, NICs 129, secondary storage, and so on. Alternatively, hypervisor 140 may rely on the host OS 110 to manage the system resources. The hypervisor 140, though typically implemented in software, may emulate and export a bare machine interface (host hardware 105) to higher level software. Such higher level software may comprise a standard or real-time operating system (OS), may be a highly stripped down operating environment with limited operating system functionality, may not include traditional OS facilities, etc. The hypervisor 140 presents to other software (i.e., "guest" software) the abstraction of one or more virtual machines (VMs) 115-119, which may provide the same or different abstractions to various guest software (e.g., guest operating system, guest applications, etc.).

The host machine 100 hosts any number of virtual machines (VM) 115-119 (e.g., a single VM, one hundred VMs, etc.). A virtual machine 115-119 is a combination of guest software that uses an underlying emulation of host machine 100 (e.g., as provided by hypervisor 140). Each VM 115-119 may include one or multiple virtual components such as virtual processors, virtual memory, virtual devices (e.g., virtual storage), virtual NICs 160-164, and so forth. Each of these virtual components may map to a hardware component, such as a processor 120, 122, device 124, 126, external storage 132, NIC 129 or memory 128. Virtual machines 115-119 can be, for example, hardware emulation, full virtualization, para-virtualization, and operating system-level virtualization virtual machines. The guest software that runs in a VM 115-119 may include a guest operating system, guest applications, guest device drivers, etc. The virtual machines 115 may have the same or different guest operating systems, such as Windows®, Linux®, Solaris®, etc.

Some virtual machines 115-119 may include guest software that is accessible by clients (e.g., local clients and/or remote clients) to provide services to those clients. For example, VM 115 may include a virtual server such as a virtual web server, a virtual data storage server, a virtual gaming server, a virtual enterprise application server, a virtual voice over internet protocol (VOIP) server, etc. A client may connect to the virtual sever to request one or more services provided by the virtual server.

Similarly, some VMs 115-119 may include a virtual desktop. A virtual desktop is a virtualized desktop computer, and thus may include storage, an operating system, applications installed on the operating system (e.g., word processing applications, spreadsheet applications, email applications, etc.), and so on. However, rather than these functions being provided and performed at a client, they are instead provided and performed by a virtual machine 115-119. A virtual desktop can represent an output (e.g., an image to be displayed) generated by a desktop application running within a virtual machine. Graphics data associated with the virtual desktop can be captured and transmitted to a client, where the virtual desktop may be rendered by a rendering agent and presented by a client application.

Some virtual machines 117-119 may include guest software that performs one or more functions transparently to a virtual server, virtual desktop and/or client. For example, virtual machines 117-119 may include virtual appliances. A virtual appliance may be a virtual machine image file that includes a preconfigured operating system environment and a single application. A virtual appliance may simplify the delivery, setup and operation of that single application. Virtual appliances may be used for deploying network applications, such as firewalls, virtual private networks, wide area network (WAN) optimizers, and so forth.

In one embodiment, the host OS 110 includes a virtual switch 162 that communicates with the hypervisor 140. Alternatively, virtual switch 162 may be a module or daemon that is a component of the hypervisor 140. Additionally, virtual switch 162 may be subdivided into components, in which some components are included in hypervisor 140 and other components are external to hypervisor 140.

In one embodiment, the virtual switch 162 includes a routing information receiver 157 that receives hints such as routing information from the hypervisor 140 (e.g., from a routing information communicator 156 of the hypervisor 140). Routing information communicator 156 may determine routing information for virtual machines 115-119 managed by hypervisor 140 as those virtual machines are loaded (or after the virtual machines are loaded). As used herein, routing information may be any data that is usable for routing packets to a particular location (e.g., to a particular virtual machine). For example, each virtual machine 115-119 may include a virtual NIC 160-164 having a different MAC address or having the same MAC address. A virtual machine can typically run in a link layer switching mode or a network address translation (NAT) mode. In the link switching mode the virtual machine will receive packets based on the MAC address. Such a virtual machine will receive all transmission control protocol (TCP) and universal datagram protocol (UDP) packets where the destination MAC address matches the MAC address of one of the virtual NICs 160-164. In this scenario, the virtual machine is part of the Ethernet network and visible on a link layer level. In the NAT mode, the host performs network address translation to forward packets matching a specific TCP or UDP port range to a virtual machine. The host keeps a mapping for that purpose. In this scenario, all virtual machines on a host will reuse the MAC address of the host. Additionally or alternatively, VMs 115-119 may be associated with virtual local area networks (VLANs) and/or tunnels, and may have VLAN tags and/or tunnel identifiers (IDs) indicating such. Routing information communicator 156 may send messages to routing information receiver 157 of virtual switch 162 with such routing information.

Virtual switch 162 uses the received hints or routing information to generate wild card flow entries and add these wild card flow entries to a wild card routing table 158. As used herein, a wild card routing table is a routing table 158 that includes at least one wild card routing entry. A wild card flow entry is a flow entry in a routing table whose conditions are satisfied when one or a few fields match properties of a network packet. A wild card flow entry includes one or more exact match fields and one or more wild card fields. A packet will satisfy the routing conditions of the wild card flow entry if the properties of the packet match all of the values in the exact match fields for the wild card flow entry. The virtual switch 162 is described in greater detail below with reference to FIGS. 2-3.

Figure 2:
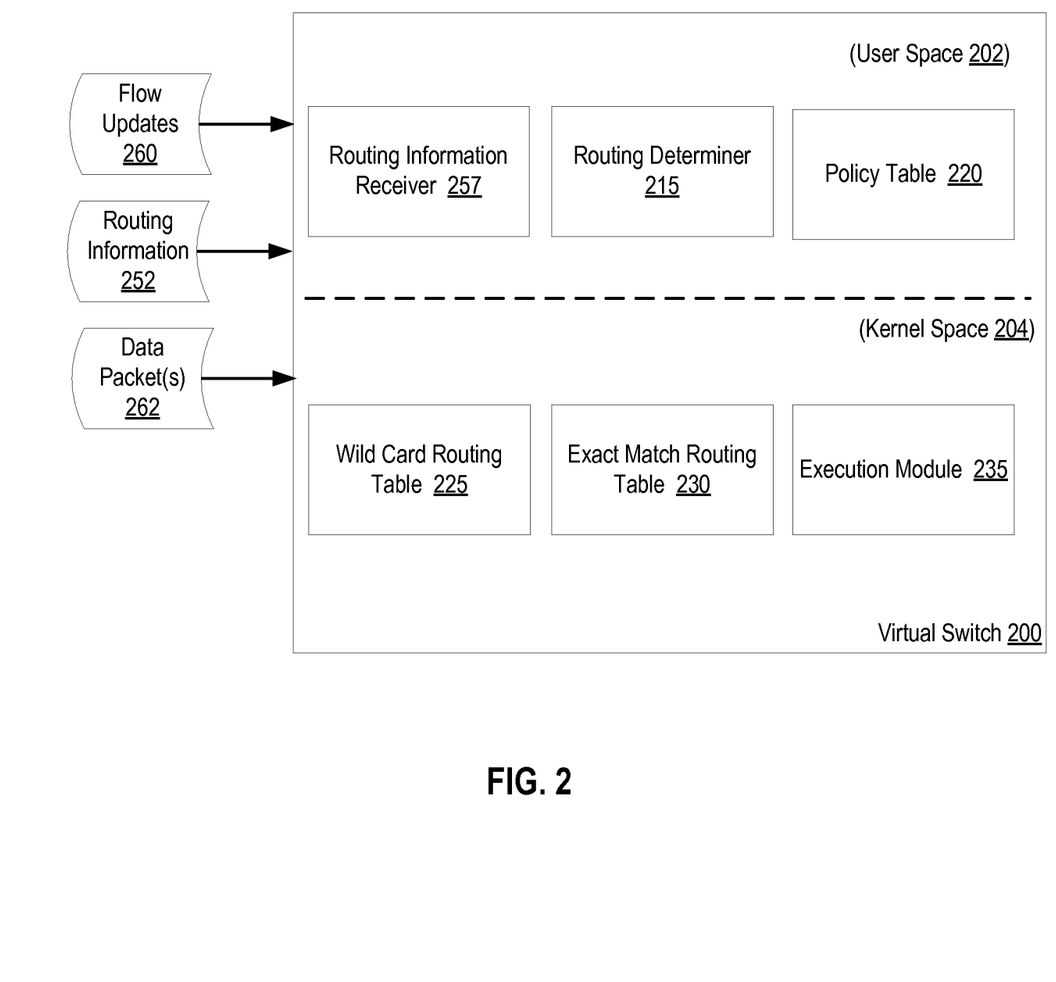
FIG. 2 is a block diagram of a virtual switch, in accordance with one embodiment of the present invention.

FIG. 2 is a block diagram of a virtual switch 200, in accordance with one embodiment of present invention. In one implementation, virtual switch 200 corresponds to virtual switch 162 of FIG. 1. Virtual switch 200 is configured to receive data packets 262 (also referred to as network packets or simply packets) that are sent over a network, and to perform actions on the data packets 262 in accordance with flow entries in one or more routing tables. The data packets 262 may be messages from or to virtual machines. For example, data packets 262 may be messages from a client to a virtual server and/or responses from the virtual server to the client. In another example, data packets 262 may be messages sent between different virtual machines. Such virtual machines may be hosted by the same host machine (and managed by the same hypervisor) or hosted by different host machines (and managed by different hypervisors).

In one embodiment, the virtual switch 200 includes a routing information receiver 257, a routing determiner 215 and a policy table 220 that run in and/or accessible from a user space 202 of an operating system. The virtual switch 200 may also include a wild card routing table 225, an exact match routing table 230 and an execution module 235 that run in and/or are accessible from a kernel space 204 of the operating system.

Wild card routing table 225 and exact match routing table 230 may be routing tables having flow entries for different network traffic flows. Alternatively, wild card routing table 225 and exact match routing table 230 may be other data structures than tables, such as lists, key value pairs, hash tables, and so forth. Additionally, one or more flow engines may be implemented instead of the exact match and wild card match flow tables. Wild card routing table 225 may be a routing table that includes one or more wild card flow entries. Exact match routing table 230 may be a routing table that does not include any wild card routing entries. In one embodiment, wild card routing table 225 and exact match routing table 230 are caches.

In alternative embodiments, wild card routing table 225 and exact match routing table 230 may be combined into a single routing table that includes both exact match flow entries and wild card flow entries. In another embodiment, exact match routing table 230 may be replaced by a second wild card routing table that includes both exact match flow entries and wild card flow entries. In instances where a single routing table includes both exact match flow entries and wild card flow entries, it may be possible for a particular packet to match both an exact match flow entry and a wild card flow entry. In one embodiment, if both an exact match flow entry and a wild card flow entry are matched, then the action indicated in the exact match flow entry is performed.

Routing information receiver 257 receives routing information 252 (also referred to simply as hints) from one or more hypervisors. The virtual switch 200 may include a management protocol that is used by the hypervisor when virtual machines are started. In response to the hypervisor using the management protocol, the routing information receiver 257 may receive the routing information. The received routing information may include data associated with a particular virtual machine or virtual machines managed by the hypervisor(s). A hypervisor may send such routing information to virtual switch 200 as virtual machines are loaded. The routing information may include data that is sufficient to uniquely identify a network location associated with the virtual machine. For example, the received routing information may include one or more of a MAC address of a virtual NIC used by the virtual machine, a transmission control protocol (TCP) port or universal datagram protocol (UDP) port, a VLAN tag identifying a virtual LAN that the virtual machine is associated with, a tunnel ID, and so forth.

Additionally, routing information for other network devices may also be received. Such routing information may be received from the network devices themselves or from other devices connected to the network. Embodiments are discussed herein with reference to routing information for virtual machines that is received from hypervisors. However, it should be understood that such embodiments described herein are equally applicable to systems in which routing information for other type of devices is received, and to systems in which such routing information is received from devices other than hypervisors.

A network on which the virtual switch 200 is deployed includes a physical network and may include one or more virtual networks. Virtual networks may be established using VLANs and/or using tunnels. A virtual network enables a single physical network to be segmented into multiple distinct virtual networks. For example, virtual machines on the same or different machines may share a virtual network. Virtual networks ensure that specific virtual machines and/or physical machines may be able to identify and communicate with other machines that share the virtual network, while at the same time not ensuring that these machines are not able to identify or communicate with other machines that share the same physical network but not the same virtual network.

As mentioned, a virtual network may be implemented using a VLAN or a tunnel. A tunnel encapsulates a network packet in a tunnel packet so that the original network packet is not seen by the physical network. A packet endpoint unpacks the tunnel packet and will process the payload of the tunnel packet as a network packet.

Routing determiner 215 uses received routing information 252 or hints to generate wild card flow entries for wild card routing table 225. In one embodiment, routing determiner 215 uses the routing information 252 in combination with the policy table 220 to generate the wild card flow entries. The wild card flow entries added to wild card routing table 225 include one or more exact match fields and one or more wild card fields.

The routing determiner 215 may enable storing of wild card flows for all switch ports or for selected switch ports. For example, in response to the hypervisor calling the management protocol of the virtual switch and providing routing information for a virtual machine, routing determiner 215 may reconfigure the policy table 220, wild card routing table 225 and/or exact match routing table 230. This may include generating a wild card flow, validating that an output of the wild card routing table and exact match routing table combined has not changed, and then inserting a wild card flow entry into the wild card routing table based on the new wild card flow. Similarly, when a virtual machine is shut down or migrated away, the hypervisor may notify the virtual switch. This may cause the virtual switch 200 to disable the wild card routing feature on a particular port, remove the wild card flow entry from the wild card routing table 225, reconfigure the routing tables and/or policy table 220, and remove the wild card flow.

Each column in a routing table may represent a different field corresponding to a different item of routing information and each row in the routing table may represent a different flow entry. Examples of fields that may be included in a routing table include MAC address, IP address, TCP/UDP port, VLAN ID, protocol, TOS, TTL, layer 3 ID, tunnel ID, and so forth. Flow entries also include a field for an action that is to be performed if the properties of a data packet 262 match the fields of a flow entry. Examples of actions that may be indicated in an action field of a flow entry include forwarding to a particular port, forwarding to multiple ports (e.g., if multiple virtual machines are to receive the packet), dropping the packet, adding a VLAN tag to the packet, removing a VLAN tag from the packet, sending the packet over a tunnel, and so forth. In one embodiment, a wild card flow entry is generated by specifying a mask that identifies which parts of a network traffic flow are wild cards and/or which parts are exact matches. Each fields of a wild card flow entry may then be designated as either a wild card field or an exact match field. In one embodiment, wild card fields for a wild card flow entry are specified using a tag or flag that indicates a wild card field. The tag or flag may be a particular bit that, when set, indicates a wild card field.

A single wild card flow entry may direct many different network traffic flows to the virtual machine that would otherwise each have had a separate exact match flow entry in the exact match routing table 230. For example, a wild card flow entry may indicate that packets for all flows that share a particular MAC address are to be forwarded to a virtual machine having that particular MAC address. In another example, a wild card flow entry may specify that all packets that share a particular IP address and VLAN ID tuple are to be forward to a particular virtual machine. In another example, a wild card flow entry may specify that all packets that share a particular VLAN ID, UP address, MAC address tuple are to be forwarded to a particular virtual machine. In another example, a wild card flow entry may specify that all packets having a particular tunnel ID are to be forwarded to another switch. Wild card flow entries may improve a routing speed and reduce lag for the virtual switch 200, and may additionally reduce an amount of system resources that are used by virtual switch 200.

The policy table 220 includes routing policies or rules that are usable to generate exact match flow entries and/or wild card flow entries in one or both of the wild card routing table 225 and the exact match routing table 230. The routing policies may include rules that specify conditions under which data packets should be sent to particular virtual machines or other destinations. Routing policies may be based on a location of a client, a type of virtual server or virtual desktop that the client is being connected to, network properties, dynamic events that may occur at the server side, and so on. Some routing policies may be static rules that are set by an administrator. Other routing policies may include thresholds that indicate under what conditions data packets should be routed to particular virtual machines. For example, routing policies may include threshold bandwidths, threshold round trip times (RTT), threshold latency, threshold load, and so forth. Some routing policies may just be associated with a particular virtual server (or virtual desktop). Other routing policies may be associated with multiple or all virtual servers and/or virtual desktops. One example routing policy specifies when to route data packets through a virtual firewall and/or when to drop data packets.

When a received data packet 262 matches either an exact match flow entry in exact match routing table 230 or a wild card flow entry in wild card routing table 225, execution module 235 performs an action. As indicated in the flow entry, the action may include forwarding the packet to one or more ports, dropping the packet, adding a VLAN tag to the packet, removing a VLAN tag from the packet, sending the packet over a tunnel, etc. The routing conditions of an exact match flow entry are satisfied if all of the fields (other than an action field) of the exact match flow entry are matched by properties of the packet. The routing conditions of a wild card flow entry are satisfied if all of the exact match fields in the wild card flow entry are matched.

If a received data packet 262 fails to satisfy the conditions of any flow entry (fails to match any flow entry), execution module 235 calls routing determiner 215 to determine an appropriate action for the packet. This may include using an interrupt to switch a context from the kernel space 204 to the user space 202. Routing determiner 215 may then perform standard switching behavior such as flooding the network (e.g., sending the packet to all ports except for a port that the packet was received from) and waiting to receive a response from a port. A response from another port may be considered to be a flow update 260. Additionally, flow updates 260 may be received form a control plane. Once a response from a particular port (flow update 260) is received, routing determiner 215 may generate a new exact match entry for that port and add the new exact match entry to the exact match routing table 230. The new exact match flow entry would include all of the properties of the packet, which define a particular network traffic flow, and would further include an action. Likely the included action would be to drop the packet, such as if the port is for a virtual machine associated with a different virtual switch.

In one embodiment, routing determiner 215 updates the exact match routing table 230 and wild card routing table 225 to ensure that in combination they are equivalent to an output of the policy table 220. This ensures that the correct routing operation is performed for received packets. In one embodiment, routing determiner 215 reviews the exact match routing table 230 to identify multiple different flow entries with overlapping values and that share the same action (e.g., that all forward packets to the same port or that all drop packets). Such reviews may be performed periodically or based on a trigger. An example of a trigger is the exact match routing table having more than a threshold number of entries. Routing determiner 215 may then generate a wild card flow entry that encompasses all of the identified entries with the overlapping values and add this wild card flow entry to the wild card routing table 225. Additionally, routing determiner 215 may update the exact match routing table 230 by removing the exact match flow entries that were used to generate the wild card flow entry. Thus, routing determiner 215 may consolidate exact match flow entries into a smaller number of wild card flow entries.

It should be noted that in many instances the virtual switch 200 runs on a same physical machine as virtual machines for which the virtual switch handles routing. However, in some embodiments the virtual switch 200 may run on a different physical machine than the virtual machines. A virtual switch 200 that is not collocated with virtual machines may provide an additional switching layer, or may have a tunnel endpoint to another virtual switch (or virtual switches) that is collocated with virtual machines.

Figure 3:
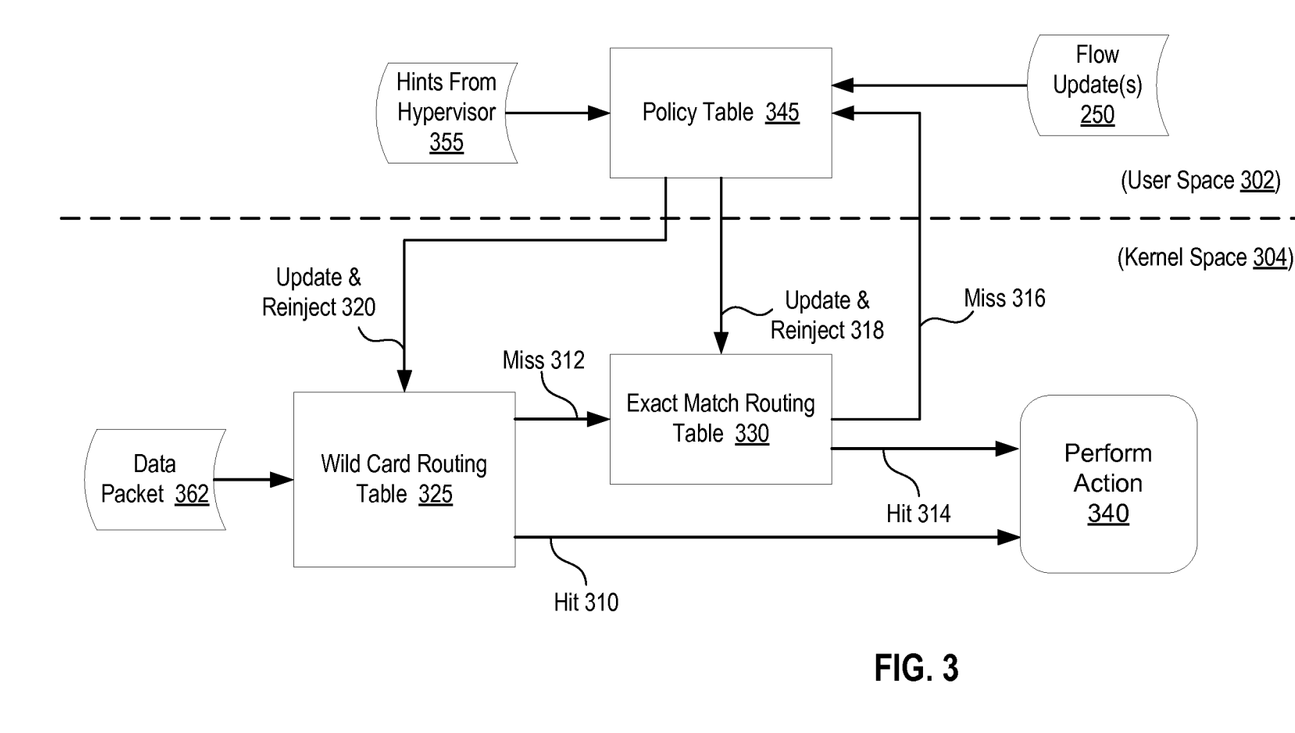
FIG. 3 is a block diagram of a switching process of a physical or virtual switch, in accordance with one embodiment of the present invention.

FIG. 3 is a block diagram of a switching process of a physical or virtual switch, in accordance with one embodiment of the present invention. A data packet 362 is received by a second component of a virtual switch running in a kernel space 304. The second component compares properties of the data packet 362 to wild card flow entries in a wild card routing table 325. If no matching wild card flow entry is found, this results in a miss 312. If a matching wild card flow entry is found, this results in a hit 310.

Responsive to a hit 310, the second component performs an action (block 340) indicated in the matching wild card flow entry. Responsive to a miss 312, the second component compares the properties of the data packet 362 to exact match flow entries in an exact match routing table 330. If the properties exactly match the fields of an exact match flow entry in the exact match routing table 330, a hit is achieved, causing an action indicated in the exact match flow entry to be performed (block 340).

If the properties of the data packet 362 fail to match any exact match flow entry, a miss 316 occurs. Such a miss will occur if, for example, the data packet is the first packet that has been received for a particular network flow. Responsive to a miss 316, the second component running in the kernel space 304 invokes a first component of the virtual switch running in the user space 302, and causes a context to switch to the user space 302. The first component determines an appropriate action to perform for the packet based on a policy table 345, hints from a hypervisor 355 and/or received flow updates 250 associated with the data packet 362. Once the first component determines the appropriate action, the first component may generate a new exact match flow entry and update 318 the exact match routing table by adding the new exact match flow entry to the exact match routing table 330. Alternatively or additionally, the first component may generate a new wild card flow entry and update 320 the wild card routing table 325 by adding to it the new wild card flow entry.

After the wild card routing table 325 and/or exact match routing table 330 are updated, the first component may switch the context back to the kernel space 304 and return control to the second component. The second component may then re-check the data packet 362 against the wild card routing table 325 and/or exact match routing table 330. This would result in a match to the new flow entry, causing the second component to perform the action indicated in the new flow entry at block 340.

Figure 4:
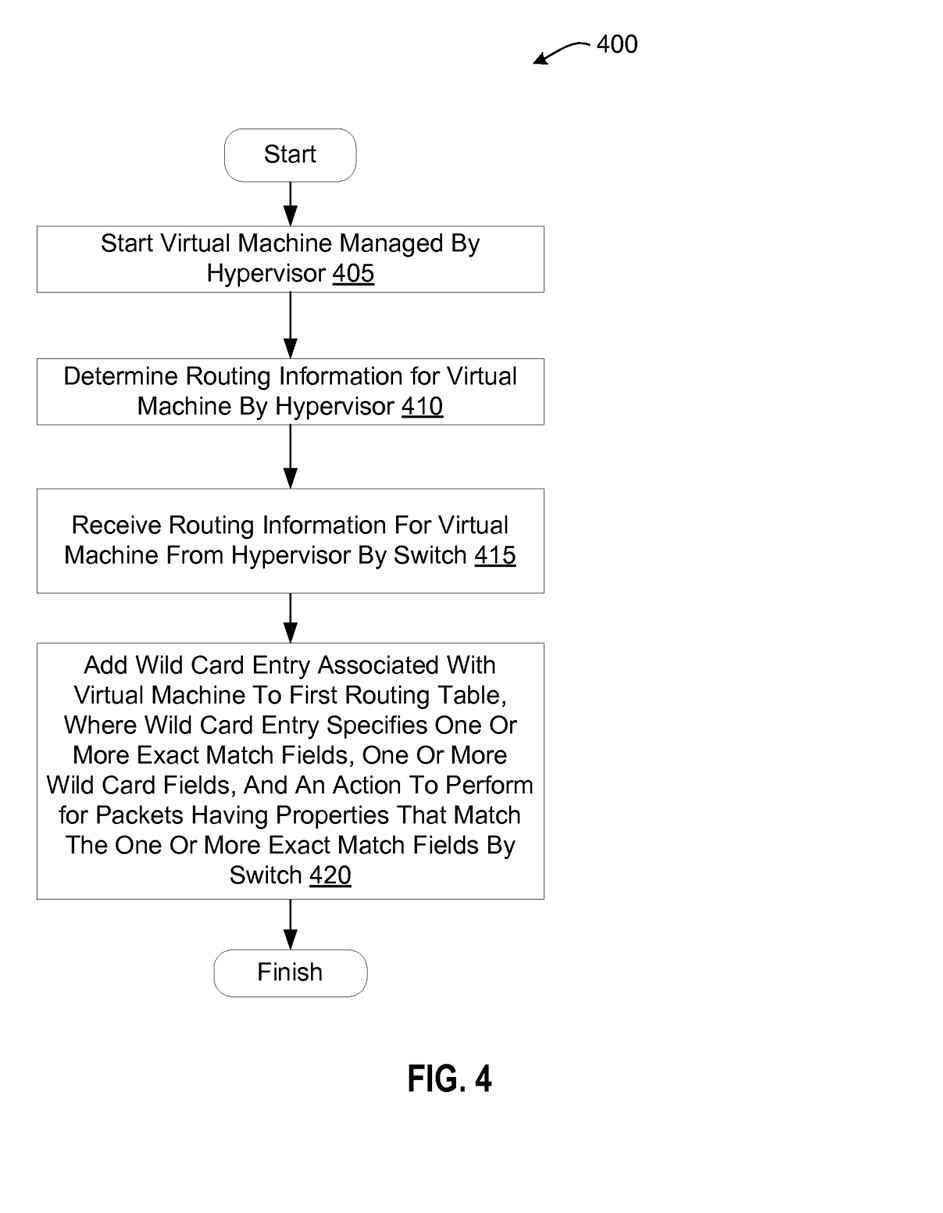
FIG. 4 is a flow diagram illustrating one embodiment for a method of establishing a wild card routing table to be used by a network switch.
Figure 5:
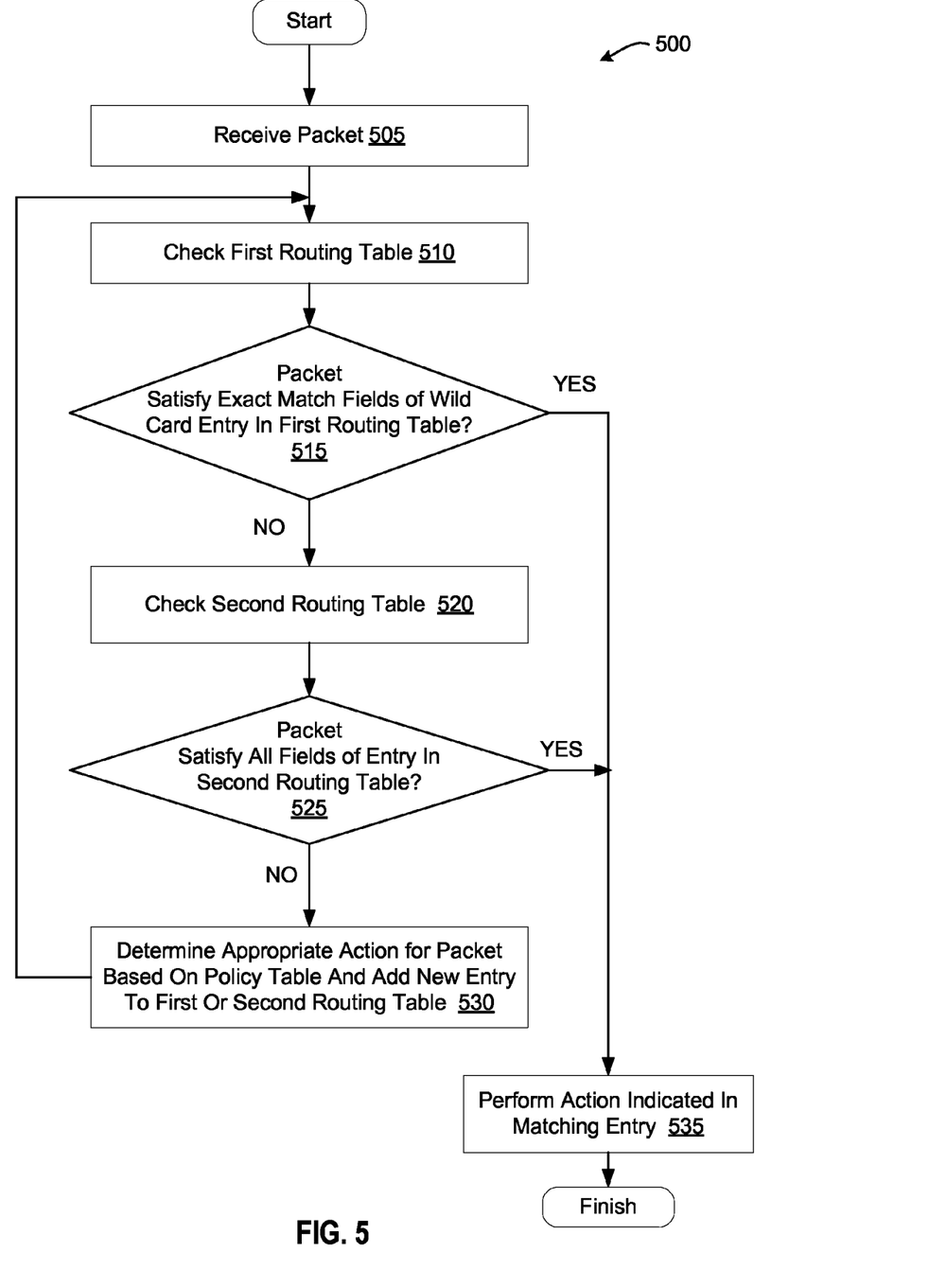
FIG. 5 is a flow diagram illustrating one embodiment for a method of implementing network switching using a wild card routing table.

FIGS. 4-5 are flow diagrams of various embodiments of methods related to routing data through virtual switches based on wild card flow entries. The methods are performed by processing logic that may include hardware (circuitry, dedicated logic, etc.), software (such as is run on a general purpose computer system or a dedicated machine), or a combination of both. In one implementation, the methods are performed by a physical network switch. In another implementation, the methods are performed by a virtual switch running on a host machine, such as virtual switch 162 running on host machine 100 of FIG. 1.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

FIG. 4 is a flow diagram illustrating one embodiment for a method 400 of establishing a wild card routing table to be used by a physical or virtual network switch. At block 405 of method 400, a hypervisor starts a virtual machine. At block 420, the hypervisor determines routing information for the virtual machine, such as a MAC address of a virtual NIC for the virtual machine and a TCP/UDP port address used by the virtual NIC.

At block 415, the switch receives the routing information for the virtual machine from the hypervisor. This routing information may be considered hints usable to generate a wild card flow entry in a routing table. At block 420, the switch adds a wild card flow entry associated with the virtual machine to a first routing table, which may be a wild card routing table. The wild card flow entry specifies one or more exact match fields, one or more wild card fields and an action to perform on a packet if properties of the packet match the one or more exact match fields. The method then ends.

FIG. 5 is a flow diagram illustrating one embodiment for a method 500 of implementing network switching using a wild card routing table. At block 505 of method 500 processing logic receives a packet 505. At block 510, processing logic checks a first routing table to determine whether properties of the packet match exact match fields of any wild card flow entry in the first routing table. At block 515, if the packet satisfies or matches the exact match fields of a wild card flow entry in the first routing table, the method proceeds to block 535. Otherwise, the method continues to block 520.

At block 520, processing logic checks a second routing table to determine whether properties of the packet match all of the fields of any exact match flow entry in the second routing table. At block 525, if the packet satisfies or matches all of the fields of an exact card flow entry in the second routing table, the method proceeds to block 535. Otherwise, the method continues to block 530.

At block 530, processing logic determines an appropriate action for the packet based on a policy table and/or flow updates received from the network. Processing logic then adds a new entry to the first or second routing table. The method then returns to block 510.

At block 535, processing logic performs the action indicated in the matching flow entry. The method then ends.

Figure 6:
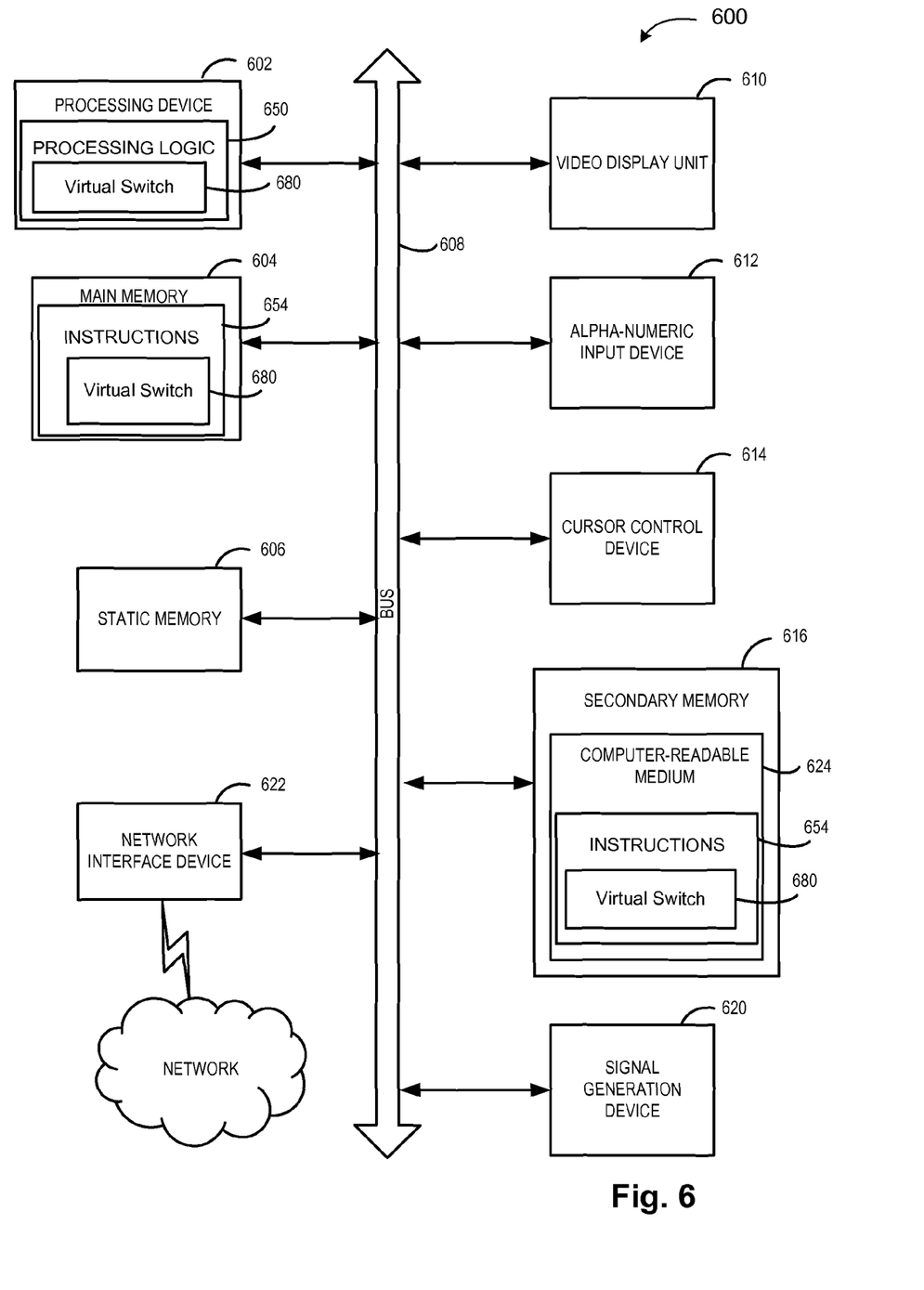
FIG. 6 illustrates a diagrammatic representation of a machine in the exemplary form of a computer system.

FIG. 6 illustrates a diagrammatic representation of a machine in the exemplary form of a computer system 600 within which a set of instructions, for causing the machine to perform any one or more of the methodologies discussed herein, may be executed. The computer system 600 may correspond to host machine 100 of FIG. 1. In embodiments of the present invention, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 616 (e.g., a data storage device), which communicate with each other via a bus 608.

The processing device 602 represents one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core CPU, a multi-core CPU and a massively multi-core system that includes many interconnected integrated circuits, each of which may include multiple processor cores. The processing device 602 may therefore include multiple processors. The processing device 602 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 602 may also be one or more special-purpose processing devices such as an application specific integrated circuit (ASIC), a field programmable gate array (FPGA), a digital signal processor (DSP), network processor, or the like.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The secondary memory 616 may include a machine-readable storage medium (or more specifically a computer-readable storage medium) 624 on which is stored one or more sets of instructions 654 embodying any one or more of the methodologies or functions described herein (e.g., virtual switch 680). The instructions 654 may also reside, completely or at least partially, within the main memory 604 and/or within the processing device 602 during execution thereof by the computer system 600; the main memory 604 and the processing device 602 also constituting machine-readable storage media.

While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine that cause the machine to perform any one or more of the methodologies of the present invention. The term "computer-readable storage medium" shall accordingly be taken to include, but not be limited to, non-transitory media such as solid-state memories, and optical and magnetic media.

The modules, components and other features described herein (for example in relation to FIG. 1) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "adding", "receiving", "determining", "routing", "performing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   receiving, by a processing device executing a first component of a virtual switch in a user space, routing information pertaining to a virtual machine from a hypervisor managing the virtual machine;
   determining, by the processing device, a wild card entry associated with the virtual machine for a first routing data structure that is accessible in a kernel space, wherein the wild card entry is determined using the routing information and one or more routing policies;
   adding, by the processing device, the wild card entry associated with the virtual machine to the first routing data structure, wherein the wild card entry specifies one or more exact match fields, one or more wild card fields and an action to perform for packets having properties that match the one or more exact match fields;
   receiving an indication that the virtual machine has been shut down; and
   removing the wild card entry associated with the virtual machine from the first routing data structure.

2. The method of claim 1, wherein the routing information comprises a media access control (MAC) address and a transmission control protocol (TCP) port, and wherein the MAC address is written to one of the one or more exact match fields.

3. The method of claim 1, wherein the routing information comprises an internet protocol (IP) address, a virtual local area network (VLAN) identifier (ID) and a transmission control protocol (TCP) port, and wherein the IP address and VLAN ID are written to the one or more exact match fields.

4. The method of claim 1, wherein the routing information comprises a tunnel identifier (ID), and wherein the tunnel ID is written to one of the one or more exact match fields.

5. The method of claim 1, further comprising:
   receiving a packet while the wild card entry is in the first routing data structure;
   determining whether the packet has properties that match the one or more exact match fields of the wild card entry in the first routing data structure; and
   responsive to determining that the properties of the packet match the one or more exact match fields, performing the action on the packet.

6. The method of claim 5, further comprising:
   responsive to determining that the properties of the packet fail to match the one or more exact match fields, determining whether the properties of the packet match an exact match entry in a second routing data structure; and
   responsive to determining that the properties of the packet match an exact match entry, performing an action identified in the exact match entry.

7. The method of claim 6, further comprising:
   responsive to determining that the properties of the packet fail to match any exact match entry in the second routing data structure, forwarding the packet to the first component of the virtual switch in the user space by a second component of the virtual switch in the kernel space;
   determining an action to perform on the packet by the first component of the virtual switch in view of the properties of the packet; and
   adding a new exact match entry to the second routing data structure, the new exact match entry comprising the properties of the packet and the determined action.

8. The method of claim 1, wherein the action comprises at least one of forwarding the packet to one or more ports, dropping the packet, adding a VLAN tag to the packet, or sending the packet over a tunnel.

9. The method of claim 1, wherein the first routing data structure comprises both exact match entries and wild card entries, and wherein a packet having properties that match both an exact match entry and a wild card entry will have an action performed in accordance with the exact match entry.

10. The method of claim 1, wherein the hypervisor, the virtual machine and the virtual switch are all hosted by a same physical machine.

11. The method of claim 1, wherein the virtual switch is hosted by a first physical machine and the virtual machine is hosted by a second physical machine that also hosts an additional virtual switch.

12. The method of claim 1, further comprising:
   reviewing a second routing data structure to identify a plurality of entries having overlapping values and a same action;
   determining an additional wild card entry that encompasses the plurality of entries for the first routing data structure;
   adding the additional wild card entry to the first routing data structure; and
   removing the plurality of entries from the second routing data structure.

13. A non-transitory computer readable storage medium having instructions that, when executed by a processing device, cause the processing device to:
   receive, by the processing device, routing information pertaining to a virtual machine from a hypervisor managing the virtual machine;
   determine, by the processing device, a wild card entry associated with the virtual machine for a first routing data structure that is accessible in a kernel space, wherein the wild card entry is determined using the routing information and one or more routing policies;
   add, by the processing device, the wild card entry associated with the virtual machine to the first routing data structure, wherein the wild card entry specifies one or more exact match fields, one or more wild card fields and an action to perform for packets having properties that match the one or more exact match fields;
   receive an indication that the virtual machine has been shut down; and
   remove the wild card entry associated with the virtual machine from the first routing data structure.

14. The non-transitory computer readable storage medium of claim 13, wherein the processing device is further to:
   receive a packet while the wild card entry is in the first routing data structure;
   determine whether the packet has properties that match the one or more exact match fields of the wild card entry in the first routing data structure; and responsive to determining that the properties of the packet match the one or more exact match fields, perform the action on the packet.

15. The non-transitory computer readable storage medium of claim 14, wherein the processing device is further to:
responsive to determining that the properties of the packet fail to match the one or more exact match fields, determine whether the properties of the packet match an exact match entry in a second routing data structure; and
responsive to determining that the properties of the packet match an exact match entry, perform an action identified in the exact match entry.

16. The non-transitory computer readable storage medium of claim 13, wherein the processing device executes a virtual switch having a first component in a user space and a second component in a kernel space, and wherein the processing device is further to:
responsive to determining that the properties of the packet fail to match any exact match entry in the second routing data structure, forward the packet to the first component of the virtual switch in the user space by the second component of the virtual switch in the kernel space;
determine an action to perform on the packet by the first component of the virtual switch in view of the properties of the packet; and
add a new exact match entry to the second routing data structure, the new exact match entry comprising the properties of the packet and the determined action.

17. The non-transitory computer readable storage medium of claim 13, wherein the first routing data structure comprises both exact match entries and wild card entries, and wherein a packet having properties that match both an exact match entry and a wild card entry will have an action performed in accordance with the exact match entry.

18. The non-transitory computer readable storage medium of claim 13, wherein the routing information comprises an internet protocol (IP) address, a virtual local area network (VLAN) identifier (ID) and a transmission control protocol (TCP) port, and wherein the IP address and VLAN ID are written to the one or more exact match fields.

19. A computing device comprising:
a memory to store instructions for a virtual switch;
a processing device operatively coupled to the memory; and
the virtual switch, executed by the processing device, comprising a first component that runs in a user space, wherein the first component is to:
receive information pertaining to a virtual machine from a hypervisor managing the virtual machine;
determine a wild card entry associated with the virtual machine for a first routing data structure that is accessible in a kernel space, wherein the wild card entry is determined using the information and one or more routing policies;
add the wild card entry associated with the virtual machine to the first routing data structure, wherein the wild card entry specifies one or more exact match fields, one or more wild card fields and an action to perform for packets having properties that match the one or more exact match fields;
receive an indication that the virtual machine has been shut down; and
remove the wild card entry associated with the virtual machine from the first routing data structure.

* * * * *